May 27, 1930.  W. G. MACOMBER  1,760,201

SPRINKLER HEAD

Filed March 13, 1928

Inventor
Walter G. Macomber
By Lyon & Lyon
Attorney

Patented May 27, 1930

1,760,201

UNITED STATES PATENT OFFICE

WALTER G. MACOMBER, OF LOS ANGELES, CALIFORNIA

SPRINKLER HEAD

Application filed March 13, 1928. Serial No. 261,256.

This invention relates to sprinkler heads of the rotary type useful, for example, for sprinkling lawns and for overhead irrigation of any description.

One of the faults to be found with many prior known rotary sprinkler heads is the difficulty of properly lubricating them and retaining the lubrication, since the bearings are more or less exposed to the current of water through the sprinkler head, resulting in washing out of the lubricant from the bearing. It is an important object of the present invention to avoid the above mentioned difficulty and to provide a bearing that is practically not exposed at all to the flow of water through the sprinkler head.

Another object is simplicity and inexpensiveness of construction.

The accompanying drawings illustrate the invention:

Figure 1:
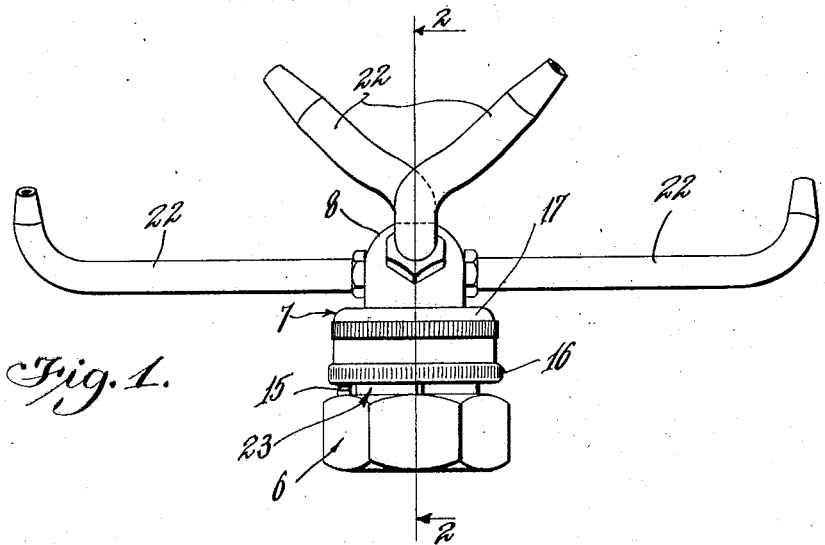
Figure 1 is a side elevation of a sprinkler head constructed in accordance with the provisions of this invention.

Referring to the drawings, the sprinkler head comprises a nozzle member 6, a bearing 7 mounted on the nozzle member, and a hollow ported cap 8 which is mounted to rotate in the bearing and encloses the discharge end 9 of the nozzle member. The port or ports with which the cap 8 is provided, are indicated at 10 and, in this instance, said ports are arranged with their axes pointing obliquely upwardly and outwardly.

In this particular instance, the discharge end 9 of the nozzle 6 is conical in shape and the cap 8 is provided with an internally tapered portion 11 which loosely fits over the conical discharge end. One end of the nozzle member 6 is provided with screw threads 12 so that it can be readily connected to a hose coupling or pipe through which the water flows into the nozzle member.

The nozzle member 6 is provided with spaced inner and outer walls, the conical discharge end 9 constituting the inner wall and the outer wall being indicated at 13. The space between the walls 9, 13 constitutes an annular groove 14 into which the cap 8 projects. The bearing 7 is mounted on the outer wall 13 being, in this instance, attached to said wall by a screw threaded connection 15. A jamb nut 16 is screwed onto the wall 13 and engages the lower end of the bearing 7 so as to lock said bearing and nozzle member 6 against relative turning.

Figure 2:
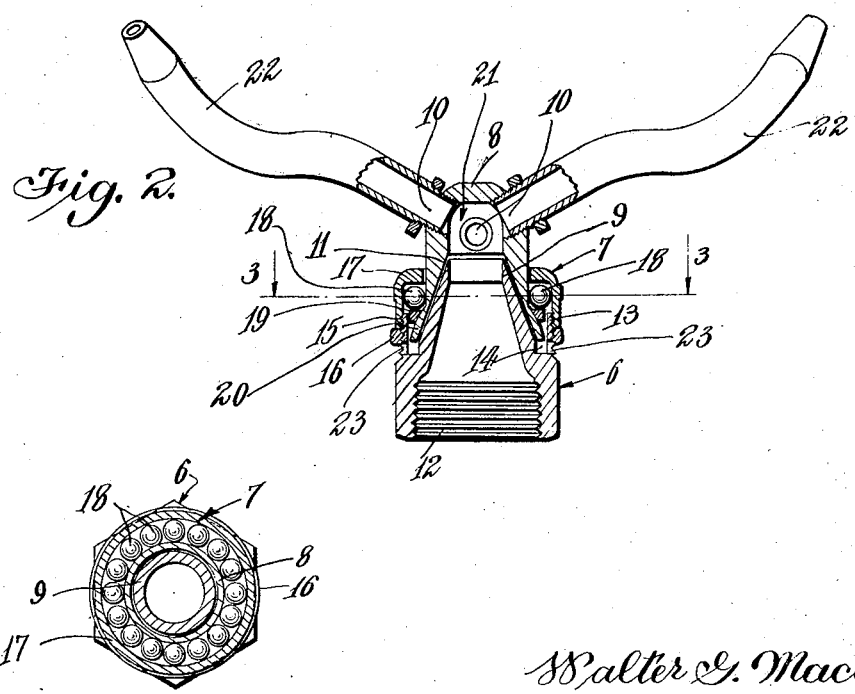
Figure 2 is a vertical section on the line indicated by 2—2, Figure 1.
Figure 3:
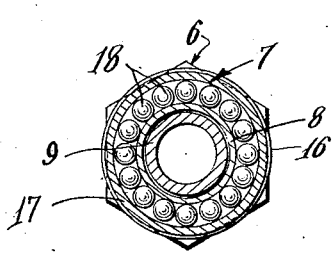
Figure 3 is a horizontal section on the line indicated by 3—3, Figure 2.

In the instance shown, the bearing 7 is of the ball type, the cup 17 thereof being the member that is screwed onto the wall 13. The bearing 7 also comprises balls 18 and a ring 19 which is loosely mounted on an enlargement 20 formed on the lower portion of the cap 8. The outer face of the enlargement 20 is convex and the ring 19 is self-adjusting on said outer face so that the pressure on the balls 18 will be maintained uniform. By screwing the cup 17 up or down on the nozzle member 6 adjustment between the cap 8 and nozzle member may be secured. Preferably the cup 17 will be adjusted so as to give a very slight clearance between the tapered portion 11 and wall 9. This clearance is somewhat exaggerated in Fig. 2 of the drawings.

The invention operates as follows: The water under pressure flows into the nozzle member 6 and is directed by the wall 9 into the bore 21 of the cap and the water flows out of said cap through the ports 10 into jet tubes 22 which are threaded into the ports 10. The outer ends of the jet tubes are bent at an angle relative to the inner ends so as to secure a propelling action by the water as it leaves said jet tubes. It will be noted that whatever water leaks between the wall 9 and tapered portion 11 is directed into the annular groove 14. From this groove, such water finds exit through a port or ports 23 which open into said groove adjacent to the junction of the walls 9, 13 and just beneath the jamb nut 16. The water that thus leaks between the cap and nozzle member is disposed of so that it is not forced upwardly through the bearing and, accordingly, the lubricant with which the bearing may be supplied will be maintained intact and will not be washed out of the bearing.

I claim:

1. A sprinkler head comprising a nozzle member, a bearing mounted on the nozzle member, and a hollow ported cap extending through and rotating in the bearing and enclosing the discharge end of the nozzle member, the nozzle member provided with an open port below the bearing to drain off liquid that leaks between the nozzle and cap.

2. A sprinkler head comprising a nozzle member having a conical discharge end, a bearing mounted on the nozzle member and surrounding the conical discharge end, and a hollow ported cap extending through and rotating in the bearing and provided with an internally tapered portion loosely fitting over the conical discharge end, the nozzle member provided with a port below the bearing to drain off liquid that leaks between the internal tapered portion and the conical discharge end.

3. A sprinkler head comprising a nozzle member provided with spaced inner and outer walls, the outer wall provided with a port to drain off liquid that leaks downwardly between said walls, an open bearing mounted on the outer wall, the inner wall projecting through said bearing, and a hollow ported cap extending through and rotating in the bearing and enclosing the inner wall.

4. A sprinkler head comprising a nozzle member provided with spaced inner and outer walls, the outer wall provided with a port to drain off liquid that leaks downwardly between said walls, a bearing mounted on the outer wall, the inner wall provided with a conical portion and projecting through the bearing, and a hollow ported cap extending through and rotating in the bearing and provided with an internally tapered portion loosely fitting over the conical portion.

5. A sprinkler head comprising a nozzle member having an upwardly directed discharge end, a bearing mounted on the nozzle member and surrounding the discharge end, and a hollow ported cap extending through and rotating in the bearing and provided with a portion loosely fitting over the discharge end, the nozzle member provided with an open port below the bearing in communication with the space between the discharge end and the cap to drain off liquid that leaks through said space, said space at its upper end communicating with the bore of the cap.

Signed at Los Angeles, California, this 25th day of February, 1928.

WALTER G. MACOMBER.